(12) United States Patent
Rosenberg

(10) Patent No.: US 9,386,276 B2
(45) Date of Patent: Jul. 5, 2016

(54) METHOD AND SYSTEM FOR DETERMINING REFERENCE POINTS IN VIDEO IMAGE FRAMES

(75) Inventor: Yaakov Moshe Rosenberg, Even Yehuda (IL)

(73) Assignee: Polycom, Inc., San Jose, CA (US)

( * ) Notice: Subject to any disclaimer, the term of this patent is extended or adjusted under 35 U.S.C. 154(b) by 898 days.

(21) Appl. No.: 13/558,739

(22) Filed: Jul. 26, 2012

(65) Prior Publication Data

US 2013/0250036 A1 Sep. 26, 2013

Related U.S. Application Data

(60) Provisional application No. 61/614,723, filed on Mar. 23, 2012.

(51) Int. Cl.
*H04N 7/15* (2006.01)
(52) U.S. Cl.
CPC ..................................... *H04N 7/152* (2013.01)
(58) Field of Classification Search
None
See application file for complete search history.

(56) References Cited

U.S. PATENT DOCUMENTS

| 6,300,973 | B1 | 10/2001 | Feder et al. | |
| 6,583,808 | B2 * | 6/2003 | Boulanger et al. | 348/14.09 |
| 8,228,363 | B2 | 7/2012 | Halavy | |
| 8,502,857 | B2 | 8/2013 | Halavy | |
| 8,577,083 | B2 * | 11/2013 | Kirk | 382/103 |
| 8,736,660 | B2 | 5/2014 | Rosenberg | |
| 2010/0123770 | A1 * | 5/2010 | Friel et al. | 348/14.08 |
| 2010/0128105 | A1 * | 5/2010 | Halavy | 348/14.05 |

* cited by examiner

*Primary Examiner* — Joseph J Nguyen
(74) *Attorney, Agent, or Firm* — Blank Rome, LLP

(57) ABSTRACT

A videoconferencing system for determining alignment information for images captured by two or more cameras is disclosed. The videoconferencing system can include a plurality of endpoints and at least one control unit (CU) such as a multipoint control unit (MCU), for example. An endpoint can include a plurality of cameras and at least one projector. The projector is used to project a pattern at the near end site, which pattern is captured by the plurality of cameras. The image frames produced by the cameras are processed to determine the identity and location coordinates of the images of the projected patterns. The location coordinates can be used as reference points to be used by applications such as telepresence, 3D videoconferencing, and morphing.

25 Claims, 9 Drawing Sheets

METHOD AND SYSTEM FOR DETERMINING REFERENCE POINTS IN VIDEO IMAGE FRAMES

CROSS REFERENCE TO RELATED APPLICATIONS

This application claims priority to U.S. Provisional Application Ser. No. 61/614,723 entitled "Method and System for Auto-Setting of Reference Points in Video Conferencing" filed Mar. 23, 2012, which is incorporated by reference in its entirety herein.

TECHNICAL FIELD

The present invention relates to video communication and more particularly to the field of multipoint video conferencing.

BACKGROUND ART

Videoconferencing enables individuals located remotely from one another to conduct a face-to-face meeting. Videoconferencing may be executed by using audio and video telecommunications. A videoconference may be between as few as two sites (point-to-point), or between several sites (multi-point). A conference site may include a single participant (user, conferee) or several participants (users, conferees). Videoconferencing may also be used to share documents, presentations, information, and the like.

Participants may take part in a videoconference via a videoconferencing endpoint (EP), for example. An endpoint may be a terminal on a network, for example. An endpoint may be capable of providing real-time, two-way, audio/visual/data communication with other terminals and/or with a multipoint control unit (MCU). An endpoint may provide information/data in different forms, including audio; audio and video; data, audio, and video; etc. The terms "terminal," "site," and "endpoint" may be used interchangeably. In the present disclosure, the term endpoint may be used as a representative term for above group.

An endpoint may comprise a display unit (screen), upon which video images from one or more remote sites may be displayed. Example endpoints include POLYCOM® VSX® and HDX® series endpoints, each available from Polycom, Inc. (POLYCOM, VSX, and HDX are registered trademarks of Polycom, Inc.) A videoconferencing endpoint may send audio, video, and/or data from a local site to one or more remote sites, and display video and/or data received from the remote site(s) on its screen (display unit).

Video images displayed on a screen at an endpoint may be displayed in an arranged layout. A layout may include one or more segments for displaying video images. A segment may be a predefined portion of a screen of a receiving endpoint that may be allocated to a video image received from one of the sites participating in the videoconferencing session. In a videoconference between two participants, a segment may cover the entire display area of the screens of the endpoints. In each site, the segment may display the video image received from the other site.

An example of a video display mode in a videoconference between a local site and multiple remote sites may be a switching mode. In switching mode, the video/data from only one of the remote sites may be displayed on the local site's screen at a time. The displayed video may be switched to video received from another site depending on the dynamics of the conference.

In contrast to the switching mode, in a continuous presence (CP) conference, a conferee (participant) at a local endpoint may simultaneously observe several other conferees from different endpoints participating in the videoconference. Each site may be displayed in a different segment of the layout, which is displayed on the local screen. The segments may be the same size or of different sizes. The combinations of the sites displayed on a screen and their association to the segments of the layout may vary among the different sites that participate in the same session. Furthermore, in a continuous presence layout, a received video image from a site may be scaled, up or down, and/or cropped in order to fit its allocated segment size. It should be noted that the terms "conferee," "user," and "participant" may be used interchangeably.

An MCU may be used to manage a videoconference. An MCU is a conference controlling entity that is typically located in a node of a network or in a terminal that receives several channels from endpoints and, according to certain criteria, processes audio and/or visual signals and distributes them to a set of connected channels.

Examples of MCUs include the MGC-100 and RMX 2000®, available from Polycom Inc. (RMX 2000 is a registered trademark of Polycom, Inc.). Some MCUs may be composed of two logical units: a media controller (MC) and a media processor (MP). A more thorough definition of an endpoint and an MCU may be found in the International Telecommunication Union ("ITU") standards, including the H.320, H.324, and H.323 standards. Additional information regarding video conferencing standards and protocols such as ITU standards or Session Initiation Protocol (SIP) may be found at the ITU website or in Engineering Task Force (IETF) website, respectively.

In a CP videoconferencing session, the association between sites and segments may be dynamically changing according to the activities taking place in the conference. In some layouts, one of the segments may be allocated to a current speaker, for example. The other segments of that layout may be allocated to other sites that were selected as presenter sites or presenter conferees. A current speaker may be selected according to certain criteria, including having the highest audio signal strength during a certain percentage of a monitoring period. The other presenter sites may include the image of the conferee that was the previous speaker; certain conferees required by management decisions to be visible; etc. A predefined number of sites, out of a plurality of sites that participate in the session, whose audio energy is higher than the rest of the conferees can be referred to as speaking conferees, and the audio signals from the speaking conferees can be mixed. The mixed audio can be distributed to all of the conferees, or in some embodiments the audio of a speaking conferee can be removed from the mixed audio that is transmitted to that speaking conferee.

In a conventional CP videoconference, each layout is associated with a video output port of an MCU. A conventional video output port may include a CP image builder and an encoder. A conventional CP image builder may obtain decoded video images of each one of the presenter sites. The CP image builder may scale and/or crop the decoded video images to a required size of a segment in which the image will be presented. The CP image builder may further write the scaled image in a CP frame memory in a location that is associated with the location of the segment in the layout. When the CP frame memory has all the presenter images located in their associated segments, the CP image may be read from the CP frame memory by the encoder.

The encoder may encode the CP image. The encoded and/or compressed CP video image may be sent toward the endpoint of the relevant conferee. A frame memory module may employ two or more frame memories, for example, a currently encoded frame memory and a next frame memory. The memory module may alternately store and output video of consecutive frames. Conventional output ports of an MCU are well known in the art and are described in a plurality of patents and patent applications. Additional information on a conventional output port can be found, for example, in U.S. Pat. No. 6,300,973, the contents of which are incorporated herein by reference in its entirety.

Some videoconferencing techniques can include two or more video cameras to deliver video images from the same site. The two or more cameras can be used for 3D simulation, keeping an eye contact with another conferee, a Telepresence videoconferencing system (TPVS), or a simulation of TPVS, etc. The TPVS can include a large conferencing table with a line of chairs along one side of the table. A video zone is located on the other side of the table, in front of the line of chairs. The video zone can include two or more video displays, adjacent to each other and two or more video cameras. In some TPVSs, the video zone, i.e., the displays and cameras, is adjusted to a certain arrangement of the table and the line of chairs. The video camera setup is adjusted to capture the conferees sitting along the other side of the table. The two or more video images are delivered to the other end or ends of the communication session, to be displayed over a video zone in the other end TPVS. The TPVS gives the impression that the conferees, located at the other side of the communication line and using another TPVS, are sitting in the same room across the conferencing table.

A simulation of TPVS video conferencing system may allow video images from two or more cameras shooting at the same site to be displayed as a single panoramic image. Accordingly, a conferencing endpoint having a single monitor can display the panoramic image of the two or more video images from an endpoint having multiple cameras, such as a common TPVS endpoint. In order to stitch two adjacent images received from different cameras, the system needs to identify similar image elements to be used as reference points occurring in the two adjacent video images. Additional information on simulating TPVS can be found in U.S. patent application Ser. No. 12/581,626, the contents of which are incorporated herein by reference.

Another videoconferencing technique can simulate 3D video. A transmitting endpoint of a video conferencing system that simulates 3D may include two or more video cameras, each of which may record the room of the site from a different angle. The transmitting endpoint may encode each video image and send the encoded streams to an MCU.

At the MCU, each of the received video streams from a plurality of conferees is transferred toward an associated input video port. In addition to the conventional components of an input video port, the input video port may comprise a conferee-point-of-view detector (CPOVD). The CPOVD may detect the angle at which the conferee, at a receiving endpoint, looks at the screen and at which region of the screen the conferee is looking. The CPOVD may send the detected information toward a controller of the MCU. Based on the detected information the controller of the MCU, may select a video stream received from another camera of that transmitting endpoint and use it as the video image that is sent to the receiving endpoint. The selected camera can fit the point of view of the conferee in the receiving endpoint.

Embodiments of 3D simulation system may use morphing techniques for smoothing the transition from one video camera to the other. Morphing technique is well known in the video processing arts and has been used for more than twenty years. To achieve good results with minimum deformation, morphing algorithm requires few reference points to be set for each video image. Additional information on simulating 3D video conferencing can be found in U.S. patent application Ser. No. 13/105,290, the contents of which are incorporate herein by reference.

A common technique for searching for reference points involves identifying similar objects or areas in frames received from two or more cameras. However, identifying similar objects in different frames involves high processing costs in terms of time and computing resources. The system not only needs to identify different patterns within each image, but it has to compare each identified pattern with all other identified patterns in the other image. As such, these techniques can prove too expensive or impractical for near real-time videoconferencing type applications.

SUMMARY OF INVENTION

A videoconferencing system for determining alignment information for images captured by two or more cameras is disclosed. The videoconferencing system can include a plurality of endpoints and at least one control unit (CU). The CU can be associated with a multipoint-control unit (MCU) or an endpoint, for example. An endpoint can include a plurality of cameras and at least one projector. The projector is used to project a reference image at the near end site, which reference image (or a portion thereof) is captured by the plurality of cameras. The reference image can include a plurality of patterns. The image frames produced by the cameras are processed to determine the identity and location coordinates of the images of the projected patterns. The location coordinates can be used as reference points to be used by applications such as telepresence, 3D videoconferencing, and morphing.

In one example, the reference image is projected in the visible spectrum, while in another example the reference image is projected in the invisible spectrum. The endpoint can use cameras to capture the patterns in both the visible and invisible spectrum.

In one example the endpoint includes a plurality of camera pairs, where each pair includes a video camera configured to operate in the visible spectrum and a reference camera configured to operate in the invisible spectrum. The patterns can be projected in the invisible spectrum and pattern image frames captured by the reference cameras are processed to determine identities and location coordinates of the detected patterns in the reference image frames. A transformation function is used to transform the location coordinates of the patterns from the reference image frame to location coordinates in the video image frames captured by the video cameras. The transformed coordinates can be used to generate a mapping table and determine reference points.

The processing of the image frames to determine the mapping tables and the reference points can be distributed between the endpoints and the CU. In one example, majority of the processing is carried out in the endpoint. In another example, majority of the processing is carried out in the CU.

BRIEF DESCRIPTION OF DRAWINGS

Embodiments of the present invention will be understood and appreciated more fully from the following detailed description, taken in conjunction with the drawings in which.

DESCRIPTION OF EMBODIMENTS

Figure 1:
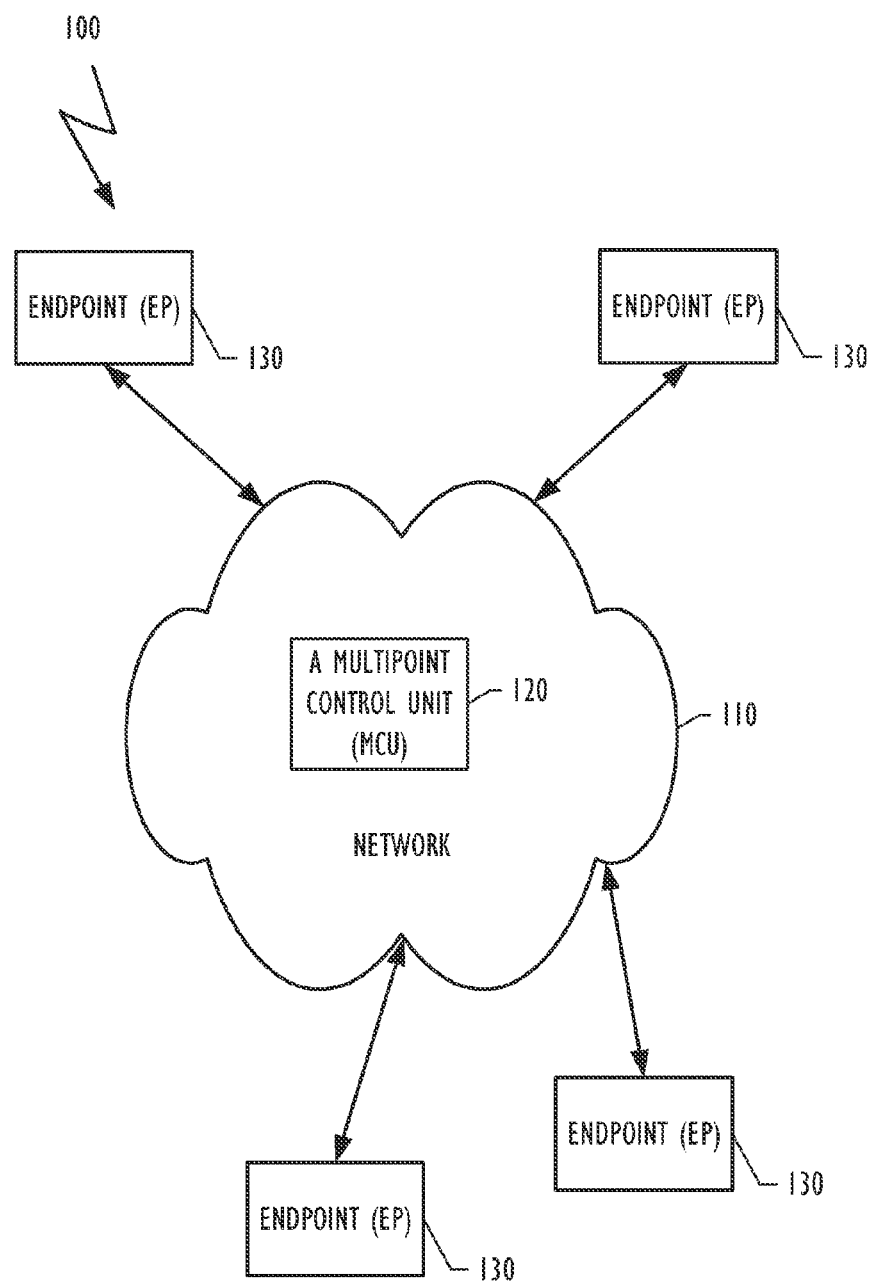
FIG. 1 illustrates a block diagram of a videoconferencing system in accordance with an embodiment of the present disclosure.

Some approaches for improving the experience of users participating in video conferencing require identification of similar areas, or points, in video images received from different video cameras that capture one or more participants in the same room. These similar points can be used as reference points to align two video images that are received from the two different cameras. Some of common techniques for searching for reference points use pattern recognition video processing methods for implementing this task. However, image processing consumes time and computing resources. Therefore, some of the new techniques samples a single frame from each camera and process it in order to identify similar areas in images received from the two different video cameras.

Thus, there is a need for a novel method and system that will enhance the capability of identifying similar areas to be used as reference points in images received from different cameras more efficiently and accurately.

In one embodiment, an endpoint may project an invisible pattern toward the area that is captured by the two or more video cameras. The invisible pattern can be delivered by a projector using invisible wavelength (Near Infra-Red (NIR), for example). Other embodiments may use visible light, which can be modulated in a way that the projected image does not affect the experience of the user. One modulation approach can be time modulation repetition rate, in which the time when a pattern is projected is modulated. Alternatively, the location and/or the shape of the projected pattern can be modulated. In some embodiments, the video cameras can be configured to capture and process both the projected invisible pattern as well as the video image of the conferees. In other embodiments, one or more reference cameras (NIR cameras, for example) or sensors can be added to the endpoint in order to capture the invisible pattern. In some embodiments one reference camera can be associated with, and placed adjacent to and be adjusted to each video camera of the endpoint.

A projected pattern may include a plurality of spots. An ID number can be allocated to each spot in the projected pattern. The ID number of each spot can be used as an index in look-up tables. The spots can differ from each other, so that each spot has a unique signature. The signature can be expressed by shape and/or intensity and/or location and/or projected-time, or any combination of those. The projected spots can differ from each other in terms of light intensity. Alternatively, the projected spots can differ from each other in terms of the area they are expected to appear in, or the time when they are expected to be projected. In other embodiments, any combination of intensity, area, or time can be implemented. In some embodiments the projected invisible image can be divided into a number of sections (e.g., four equal sections), where in each section a number of spots (e.g., five spots) can be projected. Furthermore, each section can be projected in a different time slot. Thus, at a certain time in a certain area a certain spot can be expected to be found. These spots can be captured by the reference cameras, which produce reference image frames.

A CU can receive the video images and the reference images from each endpoint participating in the video conference. In some embodiments, in which the video camera is configured to capture the video image as well as the invisible pattern, a set of video images and a set of reference images can be received from each one of the two or more video cameras. In other embodiments, in which a reference camera, associated with each video camera, is used to capture the projected images, the reference images can be received separately from the video images. The reference camera and the video camera can be adjusted together in such a way that each location in the reference image can be transformed into a corresponding location in the video image. A transformation function can be established during an adjustment process of the two associated cameras. The adjustment process may be occasionally repeated, for example, after changing the location of the endpoint, changes in the room, or any changes that can affect the image received from any of the cameras associated with the endpoint.

The CU can manage a mapping table for each endpoint, which mapping table can include a plurality of rows and columns. Each row can be associated with a projected spot and each column can be associated with the location of the spot in one of the images. In one example, the columns can be organized in pairs, where each pair can be assigned to a received reference image and its associated video image. The first column can store location coordinates of the spot in the reference image, whereas the second column store the calculated location coordinates of the spot in the associated video image.

The embodiments in which the video camera is also capable of capturing the projected pattern, the location of a spot in the video image may be the same as the location of the spot in the reference image. In embodiments in which a reference camera is used, the location of the spot in the associated video image can be calculated based on the transformation function. The location can be expressed in terms of pixel height and width (H×W) from the top left corner of the image serving as the origin. A person skilled in the art will appreciate that any corner, or for that matter, any pixel within the image, can serve as the origin with reference to which location coordinates of the spots can be determined.

In an alternate embodiment, the endpoint may mange the adjustment process, calculate the transformation function, and manage the mapping table. In such an embodiment, the endpoint may occasionally send an updated mapping table to the CU. In some embodiments the CU can be a part of an MCU. In another embodiment the CU can be a part of an endpoint. Yet in another embodiment the CU can be part of a Media Relay MCU (MRM). For the purposes of this disclosure an MRM or an MCU can be used as representative term for a CU.

In yet another embodiment a video camera and its associated reference camera can be joined into a set. The set can be adjusted mechanically and optically such that the relationship between any similar spots captured by each of the cameras (reference and video) is known, such that one can transform the location coordinates of an identified spot in the reference image received from the reference camera to the location coordinates on the video image received from the video camera.

During an ongoing videoconference session, an MCU may require location coordinates of the reference points. The need for the coordinates can occur, for example, when the MCU proceeds to update the mapping table of one of the endpoints that is participating in the videoconference session. The need for coordinates of reference points can also arise when the MCU determines to switch from one video camera to another according the gaze of a receiving conferee. During the update process, the MCU may instruct the endpoint to project the invisible pattern and to send at least one pair of reference image with its associated video image. For each received reference image the MCU can identify the signatures of each one of the plurality of spots appearing in the reference image. For each identified signature, the location of the identified spot in the reference image is stored in the relevant cell of the mapping table. The relevant cell is the cell that is at the junction of the row that is associated with the identified spot and the column associated with the reference camera that delivered the reference image. The corresponding location of the identified spot in the associated video image is calculated based on the transformation function and is stored in the adjacent cell of the mapping table. This process can be repeated for each spot identified in the reference image. At the end of the update process, the table can be used as an index to the location of reference points in the images to be used by another application such as Morphing algorithm. Some of the cells in a mapping table can be empty. Those cells can be associated with one or more spots that were not identified in the reference image frame.

In embodiments where the endpoint manages the transformation process, the endpoint may determine when to update the table or may be requested (by the MCU, for example) to update the transformation table and deliver the updated location coordinates of the reference points. In some embodiments, updating can be done each time the endpoint changes its optical state such as, for example, when the zoom of one of the video cameras is changed, or the camera's orientation is changed, etc. The projector of the invisible pattern may be activated only during the update process. After updating the transformation table, the mapping table can also be updated.

Periodically the mapping table can be updated in order to respond to changes in the location of the reference points. The changes can occur due to the dynamic of the conferencing session, movement of a certain conferee, changing position of a conferee, etc. The mapping updating period can be in the range of few tens of milliseconds to few seconds, for example.

In some embodiments, a few spots that are spread over the entire view of the cameras are projected. The images with those spots can be processed in order to determine if a change occurred. If there is a change in the location of at least one of the spots compared to the previous location, then the entire update process can be initiated.

Each time the MCU requires one or more reference points in the two video images received from the two different video cameras, the MCU can search the updated mapping table for rows that have location coordinates in cells that belong to the two currently used video cameras. These location coordinates can be used as a reference points. The identified reference points can be used for stitching the two video images, or for Morphing, etc.

Turning now to the figures in which like numerals represent like elements throughout the several views, embodiments of the present disclosure are described. For convenience, only some elements of the same group may be labeled with numerals. The purpose of the drawings is to describe embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

FIG. 1 illustrates a novel multimedia conferencing system 100, according to an embodiment of the present disclosure. System 100 can include a communication network 110, one or more multipoint control unit (MCU) 120 and two or more videoconferencing endpoints 130. In other embodiments of system 100 the MCU 120 can be a Media Relay MCU (MRM), and the plurality of endpoints 130 can be Media Relay Endpoints (MRE). Network 110 can be, but is not limited to, a packet switched network, a circuit switched network, an IP network, or any combination thereof. The multimedia communication over the network can be based on communication protocols such as, but not limited to, H.320, H.323, SIP, and may use media compression standards such as, but not limited to, audio compression standard G.711, G.719 and/or video compression standards that are used for video streaming and multi quality streams: H.264 AVC, H.264 annex G, etc.

Each endpoint 130 or MRE is capable of providing real-time, two-way audio and/or visual communication to another endpoint 130 or to the MCU 120. The endpoint 130 can be a terminal of a conferee in the session, which terminal has the ability to receive compressed media from an MCU 120 and deliver compressed audio and video data according to instructions from the MCU 120. The common operation of a video conferencing endpoint and an MCU 120 is well known to a skilled person in the art and will not be further described.

An MRE may deliver one or more compressed video streams toward an MRM and may receive one or more selected compressed video streams from an MRM. The MRE decodes the received one or more compressed video streams and may compose the decoded stream into a continuous presence (CP) video image that is displayed on the screen of the MRE. The MRM is a media relay MCU that receives a plurality of compressed video streams from a plurality of MRE, selects one or more sets of compressed video streams, and relays the one or more sets of compressed video streams toward a plurality of MREs that participate in the media relay conferencing (MRC) session. A reader who wishes to learn more about an MRE, an MRM, and an MRC is invited to read the U.S. patent application Ser. No. 12/542,450, the contents of which are incorporated herein by reference.

Some video conferencing endpoints can have two or more video cameras for capturing the same site. Such endpoints can deliver additional functionality such as simulating 3D video image. One example of a system that simulates 3D video image is disclosed in U.S. patent application Ser. No. 13/105,290, the contents of which are incorporated herein by reference. Another type of video conferencing system, in which an endpoint has two or more video cameras, is a Telepresence videoconferencing system that simulates a conference to produce a perception as if the conferees from two different sites are sitting around the same table. One example of a Telepresence system is disclosed in U.S. patent application number U.S. Ser. No. 12/581,626, the contents of which are incorporated herein by reference.

During in a video conferencing session using endpoint 130 having two or more video cameras, the endpoint 130 may need to align two video images that are received from the two cameras. In order to align the two video images, reference points in each one of the two video images is required. To accomplish this, the endpoint 130 can include additional functionality and additional elements for determining and delivering the location coordinates of these reference points. These additional components can include one or more projectors that can project a pattern (visible and invisible), one or more associated reference cameras for capturing the invisible pattern, the circuitry, and the programs for defining the coordinates of the reference points, etc. Additional details of the endpoint 130 are disclosed below in conjunction with FIG. 4A to FIG. 8.

In addition to the traditional operation of a multipoint control unit or an MRM, the MCU 120 can also be configured to manage the alignment process of the video images received from the two or more video cameras at an endpoint 130. In some embodiments the MCU 120 may handle the image processing of the video and reference images in order to identify the location coordinates of the reference points. In other embodiments the MCU 120 may instruct endpoints 130 to process the video images and the reference images to determine the location coordinates of the reference points. The location coordinates of the reference points can be sent to the MCU 120, which may use the coordinate or may relay them to one or more relevant endpoints 130. Additional details of the MCU 120 or the MRM are disclosed below in conjunction with FIGS. 2, 3, 6, 7, and 8.

Figure 2:
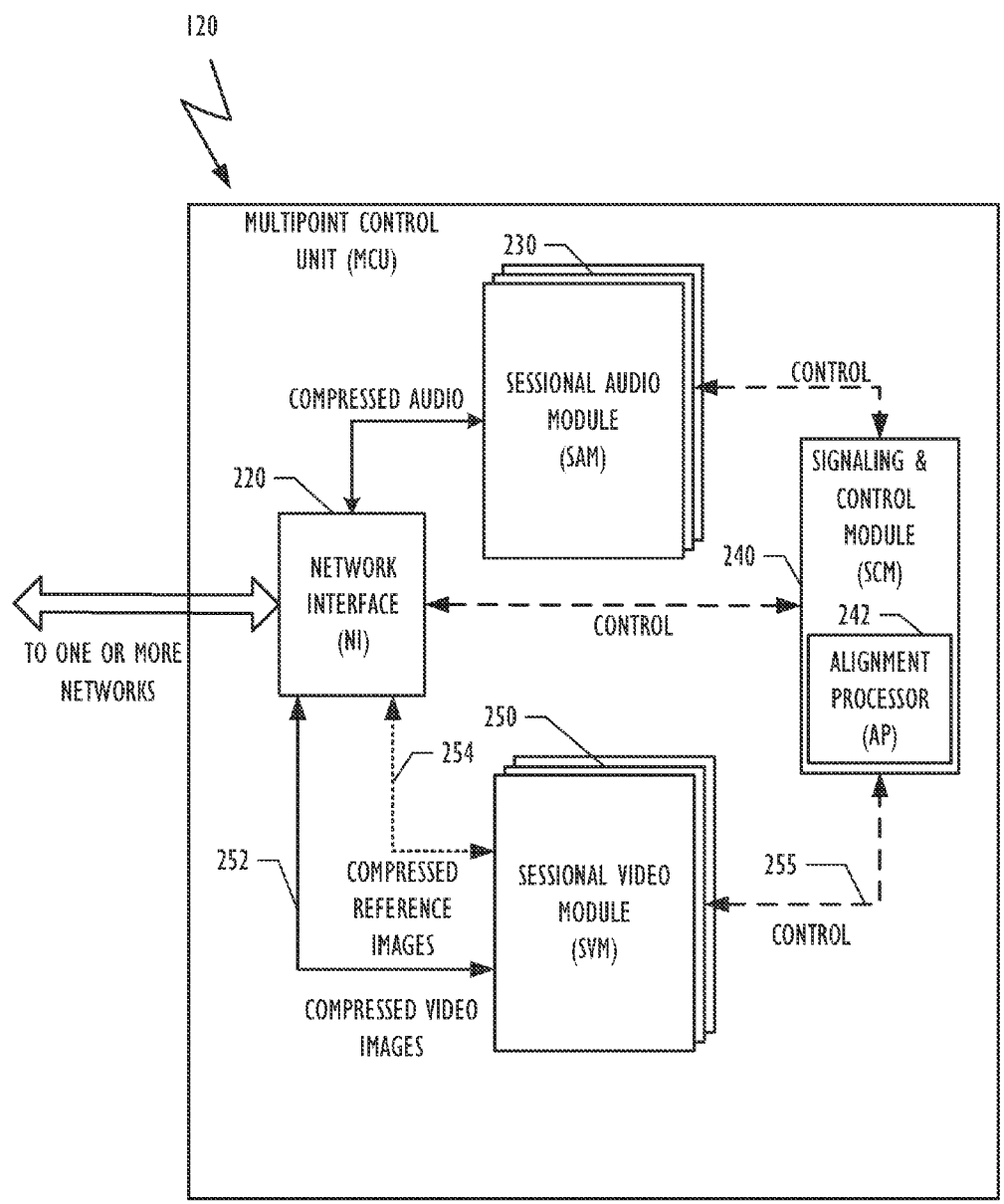
FIG. 2 shows an example of a functional block diagram of a multipoint control unit of FIG. 1 in accordance with an embodiment of the present disclosure.

FIG. 2 illustrates on example of an MCU 120, which is capable of finding and defining the coordinates of one or more reference points that appear in two video images received from two different video cameras of an endpoint 130. The identification of the reference points and defining their coordinates in each video image can be initiated by instructing the endpoint 130 to project an invisible pattern on the site, and to deliver two reference images of the projected pattern. (In instances where the patterns are projected in the visible spectrum, the video cameras 428L&R can be used to capture the projected patterns and deliver the reference images as well.) The two reference images are captured by the two reference cameras capable of capturing the invisible pattern. Each one of the reference cameras is associated with one of the video cameras. The MCU 120 may process the obtained reference images, find one or more projected spots that appear in both reference images, and determine the location coordinates of each reference point in each one of the reference images. The MCU may further transform the location coordinates in each of the reference images to location coordinates in the associated video image and use the transformed coordinates for aligning the two video images.

The MCU 120 can include a network interface module (NI) 220, one or more sessional audio module (SAM) 230, a signaling and control module (SCM) 240, and one or more sessional video module (SVM) 250. The control module 240 can include an alignment processor (AP) 242.

The NI 220 can receive communications from the plurality of endpoints 130 via the network 110 (FIG. 1). The NI 220 processes the communications according to one or more communication standards such as, but not limited to, H.320, H.323, SIP, etc. The NI 220 may also process the communications according to one or more compression standards such as, but not limited to, H.261, H.263, H.264, H.264 MVC, G.711, G.722, etc. In addition, the NI 220 may receive and transmit control and data information to/from other MCUs (not shown) and endpoints 130. Additional information regarding the communication between the endpoints 130 and the MCU 120 over network 110 and information describing signaling, control, compression, and setting a video call may be found in the international telecommunication union (ITU) standards H.320, H.321, H.323, H.261, H.263, H.264, G.711, G.722; and the Internet Engineering Task Force (IETF) standard SIP; etc.

The NI 220 can multiplex/de-multiplex various signals, media and/or "signaling and control" that are communicated between the endpoints 130 and the MCU 120. The compressed audio signals can be transferred to and from the SAM 230. The compressed video images can be transferred via the compressed video common interface 252 to and from the SVM 250. The compressed reference images can be transferred via the compressed reference common interface 254 to the SVM 250. The "control and signaling" signals can be transferred to and from SCM 240. Furthermore, if a distributed architecture is used, the NI 220 can be capable of processing and routing alignment information that is transferred from the endpoints 130 to the control module 240.

In one distributed architecture embodiment, the endpoint 130 can handle the processing of the reference images, identifying the location coordination of the reference points, and delivering the location coordinates of the reference points in both video images as the alignment information. The alignment information can be sent from an endpoint 130 to the MCU 120. In some embodiments the alignment information can be sent from the endpoint 130 as a part of a predefined header of an RTP (Real-Transport Protocol) packet. The NI 220 can be configured to process the predefined header and to transfer the alignment information to the SCM 240.

In yet another distributed architecture embodiment, the endpoint can send alignment information over the audio signal using dual-tone multi-frequency signaling (DTMF). In such an embodiment, the NI 220 processes the received signals and sends the compressed audio, carrying the DTMF signal, to the SAM 230. The SAM 230 can decompress the audio signal, decode the DTMF information, and transfer the alignment information to the SCM 240. In yet another distributed architecture embodiment, the endpoint 130 can send the alignment information via an out of band connection. The out of band connection may be carried over an Internet Protocol (IP) network, for example. In such an embodiment, the NI 220 can process the received IP packets, carried over an IP connection, and send the alignment information to the SCM 240.

The SAM 230 can receive, via the NI 220, compressed audio streams from the plurality of endpoint 130. The SAM 230 can decode the compressed audio streams, analyze the decoded streams, select certain streams, and mix the selected streams. The mixed stream can be compressed and the compressed audio stream can be sent to the network interface 220, which sends the compressed audio streams to the various endpoints 130. Different endpoints can receive different audio streams. For example, the audio stream may be formatted according to a particular communication standard and according to the needs of the individual endpoint. The audio stream may also not include the voice of the user associated with the endpoint to which the audio stream is sent. However, the voice of this user may be included in audio streams sent to all other endpoints 130.

In yet another embodiment, which can be used in MRC sessions, the MCU 120 can be replaced by an MRM. In such embodiments the SAM 230 can receive relay RTP compressed chunks of audio data (header and payloads) via the NI 220 from the different MREs that are taking part in the MRC session. Based on obtained information on the audio energy of each MRE, the SAM 230 can select a group of relay RTP compressed streams of audio chunks to be relayed to the MREs. The MREs can decode the received selected relayed audio streams, mix them, and transfer the mixed audio to the loudspeakers of the MRE. The selection can be based on comparing the audio energy, or the average energies, associated with each of the received audio streams. The number of selected relay RTP compressed streams depends on the audio mixing capabilities of the MREs. The SAM 230 can also select which MRE will be the main speaker (the one that will be displayed in the largest layout segment, for example) for a given period of time and accordingly forward signaling and control information to the SCM 240. The main speaker can be the one with the highest audio energy for a certain percentage of the heard-streams-selection intervals over a period of time.

The SVM 250 may receive a plurality of compressed video streams transmitted from the plurality of endpoints 130 via the network 110 and the NI 220, process the received streams, and send compressed video streams via the NI 220 back to the endpoints 130. One SVM 250 can be allocated for each videoconference session. Processing the received video stream can include decoding each stream, obtaining a selected group of streams to be presented, scaling the video image of each selected stream, and placing the scaled image of each selected stream in their respective segments in the layout for creating a CP video image. The CP video image can be compressed according to the requirements of the receiving one or more endpoints 130 and sent via the NI 220 to the appropriate endpoints 130.

As mentioned previously, the endpoint 130 can include two or more video cameras. Each video camera can have an associated reference camera capable of capturing an invisible projected pattern. Such an endpoint can deliver the compressed video stream from each video camera and the compressed reference image stream from the associated reference cameras. The SVM 250 can decode the plurality of streams from each endpoint 130, identify spots that appear in the two reference images, and deliver the location coordinates of the identified spots as reference points to the AP 242. The AP 242 can determine how to use the coordinates of the reference points based upon the underlying application. Such application can include, for example, the previously mentioned Morphing algorithm for switching from one video camera to the other in order to simulate 3D. Additional discussion of the operation of the SVM 250 is produced further below in conjunction of FIG. 3.

In some embodiments the endpoint 130, and not the MCU 120, can be responsible for processing the reference images. The endpoint 130 can create a mapping table, which includes the location coordinates of the spots in the reference image and the location coordinates of same spots in the video image of each set of a video camera and its associated reference camera. Further, whenever location coordinates of the reference points are needed during a conference session, the endpoint 130 can project the invisible pattern, process the reference images, and find the location coordinates of one or more reference points. The location coordinates of the reference points can be transmitted to the AP 242. In such an embodiment, in which the endpoints 130 are capable of finding and delivering the coordinates of the reference points, the SVM 250 may merely process the received compressed video streams from the two or more video cameras from each endpoint 130. Processing the received compressed video can be based on the received location coordinates of the reference points and instructions from the AP 242.

Alternatively, for an MRC session the transmitting MRE can bear the responsibility of processing the video images and the reference images, as well as calculating the location coordinates of the reference points. The location coordinates of the reference points can be transmitted in addition to the compressed video streams to the MRM. At the MRM, the AP 242, as well as SVM 250, can relay the location coordinates of the reference points in addition to relaying the compressed video streams to the receiving MREs. The receiving MREs can execute the relevant application using the received location coordinates of the reference points.

The SCM 240 controls the operation of the MCU 120 and conducts the videoconference session. In one embodiment, a single AP 242 can control the videoconferencing session. In instances where there are multiple videoconference sessions, a plurality of AP 242 can be used, where each AP 242 controls the alignment process for one videoconference session. In other embodiments an AP 242 can be allocated per each endpoint.

In some embodiments where the MCU 120 executes the entire alignment process, the AP 242 can instruct a transmitting endpoint 130 to project the invisible pattern, and deliver the reference images in addition to the video images. In addition, the AP 242 can instruct the SVM 250 to process the received video as well as the reference images, to identify spots that appear in reference images received from the two reference cameras. The SVM 250 can deliver the location coordinates of the reference points to the AP 242, which may use or transfer the location coordinates to a processor in the SVM 250 executing an application such as the Morphing algorithm.

In some instances, the transmitting endpoint 130 can determine the location coordinates of the reference points, which can be used by a receiving endpoint 130 for executing a video application that requires the alignment information. In such instances, the AP 242 can instruct the transmitting endpoint 130 to begin the alignment process and to deliver the location coordinates of the reference points. Upon receiving the location coordinates of the reference points, the AP 242 can then transfer these coordinates to the receiving endpoint 130. More information on the operation of an AP 242 is disclosed below in conjunction with FIGS. 6-8.

Figure 3:
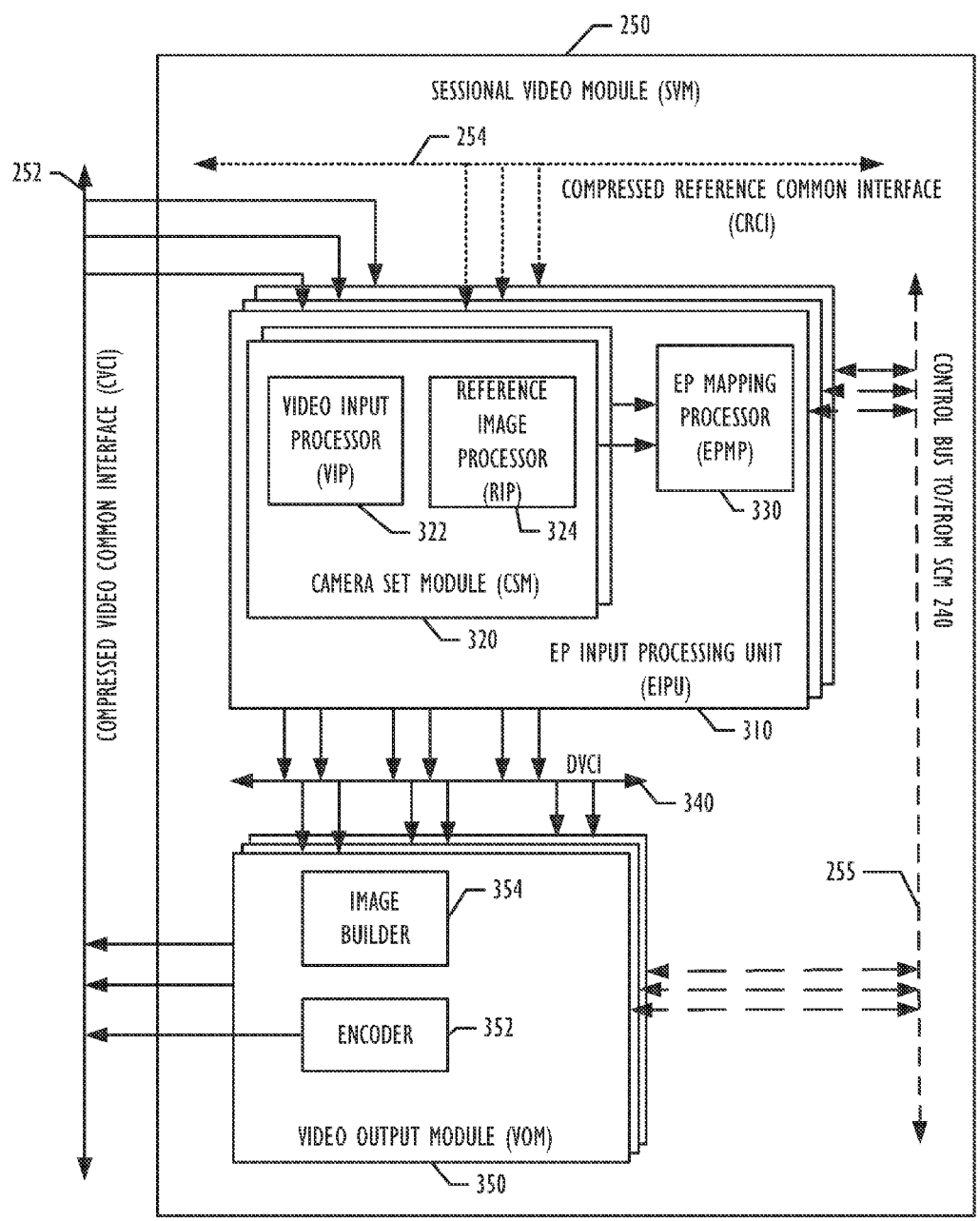
FIG. 3 shows an example of a functional block diagram of a sessional video module of the multipoint control unit of FIG. 2 in accordance with an embodiment of the present disclosure.

FIG. 3 illustrates a block diagram of an embodiment of the SVM 250. The SVM 250 can be implemented within a centralized architecture, in which the MCU 120 bears the task of processing the video and reference images as well as determining the location coordinates of the reference points. The SVM 250 can decode the received compressed video images and the compressed reference images, and process the decoded video and reference images to determine the location coordinates of the reference points for each endpoint 130. The SVM 250 can further implement video applications such as the Morphing algorithm in order to simulate 3D imaging. Subsequently, the SVM 250 can compose a CP video image, compress the CP video image, and send it to one or more receiving endpoint 130.

The SVM 250 can include a plurality of endpoint-input-processing units (EIPUs) 310, a plurality of video-output modules (VOMs) 350, and a decoded video common interface (DVCI) 340. Each EIPU 310 can be allocated to a transmitting endpoint 130 participating in the videoconferencing session associated with the SVM 250. Each VOM 350 can be allocated to a receiving endpoint 130. The EIPU 310 can include a plurality of camera-set modules (CSMs) 320. Each CSM 320 can be allocated to a set formed by a video camera and an associated reference camera. In addition the EIPU 310 can include an endpoint-mapping-processor (EPMP) 330.

Each CSM 320 can receive compressed video images generated by the video camera associated with the relevant set at the relevant endpoint via the network 110 and the NI 220 (FIG. 2), which transfers the video images via the compressed-video-common-interface (CVCI) 252. In a similar fashion, the compressed reference images generated by the associated reference camera of the set at the relevant endpoint can be received via the network 110 and the NI 220 (FIG. 2), which transfers the compressed reference images via a compressed-reference-common-interface (CRCI) 254. The CVCI 252 and the CRCI 254 can be implemented using a time domain multiplexed (TDM) bus, an addressable bus (such as an ATM bus, packet switch bus), a serial bus, a parallel bus, etc., or using connection switching, shared memory, direct connection, or any combination thereof.

At the CSM 320, the compressed video images or streams can be received by a video-input processor (VIP) 322. The VIP 322 can decode the compressed video images into decoded video images according to the appropriate compression standard. The decoded video images can be scaled or be transferred to the decoded-video-common interface (DVCI) 340. Occasionally, it may be necessary to execute an adjustment process in relation to a particular set of a video camera and an associated reference camera to update the transformation function associated with the set. As mentioned previously, the transformation functions are used for transforming location coordinates on the reference image to corresponding location coordinates on the video image. During the adjustment process, the relevant endpoint projects a visible pattern that is similar to the projected invisible pattern. The video image of the projected visible pattern can be processed by VIP 322 that decodes the compressed video. The decoded video image can be searched to identify the projected spots and their location coordinates from the top left corner of the image. The coordinates of the identified spots can be transferred to the EPMP 330. The decoded video images of the projected visible pattern may not be transferred to the DVCI 340 or can be deleted. In some embodiments the set of a video camera and the associated reference camera are adjusted mechanically and optically such that the relationship between the similar spots captured by each of the cameras is known and may remain relatively constant over time. In such cases, the transformation function may not require any updating, rendering the VIP 322 to merely perform video decoding without the need to process the video images to determine location coordinates.

During the adjustment process the endpoint 130 can also transmit the compressed reference images via the network 110 and the NI 220 (FIG. 2) to the appropriate CSM 320 over the CRCI 254. At the CSM 320 a reference image processor (RIP) 324 can decode and process the compressed reference images. The decoded reference images can be searched to identify the projected spots and their location coordinates from the top left corner of the image. The location coordinates of the identified spots can be transferred to the EPMP 330, and the decoded reference image can be deleted.

After collecting the location coordinates of the spots within a video image and the associated reference image, the EPMP 330 can define the transformation function between the video camera and the reference camera for a particular camera setup (zoom, tilt, etc.). The location can be expressed in pixels H×W from the top left corner of the image. The adjustment process can be repeated for several different camera setups of the set. The results of the transformation function can be stored in lookup tables (LUTs). One LUT can be generated for each setup or configuration (zoom, tilt, etc.) of each camera set formed by a video camera and its associated reference camera. The addresses of the LUT can reflect the location coordinates of each spot in the reference image, while the data stored at those addresses can include the corresponding location coordinates of the spot in the video image. Interpolation can be used to generate LUTs for setups other than the measured setup (ZOOM, tilt, etc.). After generating the transformation function for the first set of cameras, the above process can be repeated to generate LUTs for other sets of cameras of the endpoint 130.

During an ongoing videoconference, the reference points may be required, for example, when a conferee at the receiving endpoint changes his gaze causing the transmitting endpoint to switch from one set of camera to another. These reference points can be used by a morphing application, for example, to smooth out the changes in the video images. To generate reference points, the endpoint can be instructed to project an invisible pattern. The projected invisible pattern can be captured by a reference camera of one or more camera sets. The compressed reference image from each of the associated reference cameras can be sent to the RIP 324 in the allocated CSM 320. The RIP 324 can decode the image and search the decoded image looking for spots. The location coordinates of each identified spot can be transferred to EPMP 330. In instances where the projects the patterns in the visible spectrum, the reference images can be provided by the video cameras instead of the reference cameras. In such instances, the VIP 322 can search for the images of the projected spots and determine their location coordinates. The VIP 322 can then transfer the location coordinates to the EPMP 330.

In an example system some endpoints can use video cameras that are capable of capturing the invisible projected pattern, for example, an NIR invisible pattern. In such an embodiment an example of a VIP 322 can be configured to identify the location of the reference spots by comparing the video image received in one or more received video frames, before projecting the invisible pattern, to the video image received while projecting the invisible pattern. The video image that is received as the result of this compression can be used for detecting the reference points. In some embodiments a VIP may not present the frame which was captured while projecting the invisible pattern.

The EPMP 330 can process the received location coordinates of each identified spot received from each RIP 324 in order to create a current mapping table. A mapping table can include a plurality of rows and columns. Each row can be associated with an identified spot and each column can be associated with the location of the spot in one of the images (video and reference images of each set of cameras). In one embodiment the columns can be organized in pairs. Each pair can be assigned to a receiving reference image and its associated video image. The first column of a pair can store the location coordinates of each identified spot in the reference image. The second column of the pair can store the calculated location coordinates of the identified spot in the associated video image. Calculation of the location of the spot in the associated visible image can be based on the transformation LUT, which were created during the adjustment process.

After preparing the current mapping tables, the EPMP 330 may start looking for reference points and their locations in each image. Reference points are spots that were identified in two or more reference images received from the same endpoint. The EPMP 330 can search the current mapping tables for two camera sets for spots that appear in the two columns assigned to the reference image. Such spots can be used as reference points. The location coordinates of the reference points in the video images can be determined form the mapping table.

The calculated location coordinates of the reference spots in the two video images can be transferred to the VOM 350, which uses the reference points to execute a video application that needs the reference points. In some embodiments in which switching from one video camera to another in order to simulate 3D, the information on the reference points can be transferred to the VOM 350 that is associated to the endpoint in which the conferee changes the direction of his gaze. The VOM 350 will use the reference points when switching from the decoded video images received from one CSM 320 to the other.

In embodiments that use a decentralized architecture, some of the functionality of EIPU 310 can be implemented by each one of the participating endpoints 130. For example, the endpoint 130 can process the reference images and the video images, execute the alignment and mapping process, and deliver the location coordinates of the reference points to the MCU 120. Such an endpoint 130 is discussed in detail further below in conjunction with FIG. 4C.

The VOM 350 can include an image builder 354 and an encoder 352. Based on instructions received from the SCM 240 (FIG. 2) over the control bus 255, the image builder 354 can obtain the appropriate one or more decoded video images from DVCI 340. Each obtained decoded video image can be scaled to a size that fits its segment in a CP video image layout. The scaled video image can be placed in a CP frame memory according to the location of the image in the CP video image layout. The CP frame memory can be encoded by encoder 352 according to the compression standard and parameters used by a receiving endpoint 130 that is associated with the VOM 350. Then, the compressed CP video image can be transferred to the one or more receiving endpoints 130 via the CVCI 252 and the NI 220.

The image builder 354 can receive the location coordinates of one or more reference points from EPMP 330, and execute the application that requires the coordinates of the reference points. One representative application can be the morphing algorithm, which simulates 3D video imaging. The output image of the image builder 354 can be transmitted to the receiving endpoint 130 to which the VOM 350 has been allocated.

In some embodiments, in which an MRM is used in place of the MCU 120 (FIG. 1), some of the functionality of the SVM 250 can be implemented by each one of the MREs. In such embodiments each MRE can include a plurality of EIPUs 310 allocated to the transmitting MREs, a DVCI 340 and an image builder 354. The composed CP frame memory can be presented on the screen of the MRE. In such a scenario the MRM may relay the appropriate one or more compressed video images and compressed reference images from the plurality of transmitting MREs 130 to appropriate receiving MREs based on instructions received from the SCM 240.

In yet another embodiment, in which an MRM is used in place of the MCU 120 (FIG. 1), each MRE can process the reference images and the video images, execute the alignment and mapping process and deliver the location coordinates of the reference points to the MRM. Such an MRE is discussed in detail below in conjunction with FIG. 4C. The MRM may relay the location coordinates of the reference points to the appropriate one or more receiving MREs.

Each receiving MRE can include a plurality of decoders, a DVCI, and an image builder. Each decoder can be assigned to a stream of compressed video relayed from the MRM. In addition, each MRE can receive information related to the reference points. Based on the received information of the reference points, the image builder can switch from one video stream to another that were received from the same transmitting MRE, as was disclosed above in conjunction to image builder of SVM 250. The composed CP frame memory can be transferred from the image builder to be presented on the screen of the MRE.

The operation of the SVM 250 is disclosed in further detail below in conjunction with FIGS. 5A-8.

Figure 4A:
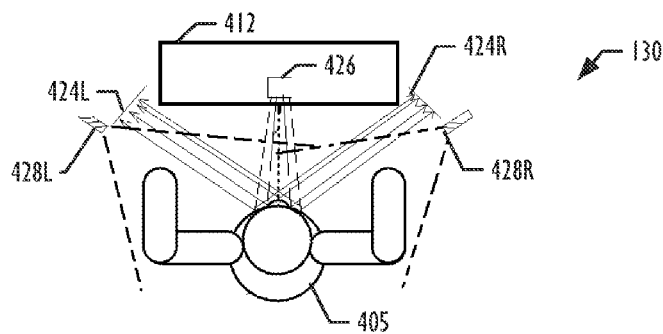
FIGS. 4A-4C depict examples of the setup and the functional block diagrams of endpoints in accordance with various embodiments of the present disclosure.

Discussion now turns to the endpoint 130, an example of which is illustrated in FIG. 4A. Endpoint 130 can include a video display unit 412 for presenting the CP video image of the videoconference session. A projector 426, configured to project image patterns in in both visible and invisible spectrum, can be placed near the display unit 412. The projector 426 can be instructed to project the image pattern at the site, which may include one or more conferees 405. In addition, endpoint 130 can include two sets of cameras, a left set and a right set. The left set includes a video camera 428L and an associated reference camera 424L. The right set includes a video camera 428R and an associated reference camera 424R. In one embodiment, the video cameras 428L and 428R can be sensitive in the visible spectrum only, while the reference cameras 424L and 424R can be sensitive in the invisible spectrum. In another embodiment, the video cameras 428L and 428R can be sensitive in both the visible and invisible spectrum. In such cases, the endpoint 130 may not include the reference cameras 424L and 424R.

The video cameras and their associated reference cameras can be mechanically and optically configured such that the spatial relationship between the two areas captured by each of the cameras is known and enables transforming the coordinates of an identified spot in the reference image received from the associated reference camera to the location coordinates on the video image received from the video camera.

The projector 426 can project an invisible pattern by using NIR light. In such an embodiment, the associated reference cameras 424L and 424R can capture and process the reflected NIR light. The projector 426 can project a group of invisible spots simultaneously. The group of spots can cover a portion of the site that is captured by the two sets of cameras, (428L, 424L) and (428R, 424R). Subsequently, the group of spots can be redirected to cover another portion of the site. This can be repeated until after a few repetitions, the group of spots covers a substantial portion of the entire site. In one embodiment changing the direction of the projected pattern can be implemented by rotating the projector 426. In other embodiment a rotating mirror can be used in order to change the direction of projected group of spots. The projector 426 can include an array of a plurality of NIR light sources, such as light-emitting diodes (LED), and lenses arranged in such a way that the projector 426 can project a plurality of NIR beams covering one portion of the site at any given time.

The projector 426 can also include light sources such as LEDs in visible wave length in association with the NIR LED. The NIR LEDs and the visible LEDs can be installed in such a way that the visible beam and the invisible beam can share the same optical axis. Thus, the projected visible pattern and the projected invisible pattern are substantially co-incident when projected onto a surface.

In one embodiment, the shapes projected by the light beams can be produced using a screen with a plurality of orifices, which can be placed perpendicular to the optical axes of both the visible and invisible light beams. Each orifice can have a different shape. More information on the invisible projected pattern is disclosed below in conjunction of FIGS. 5A and 5B.

Figure 4B:
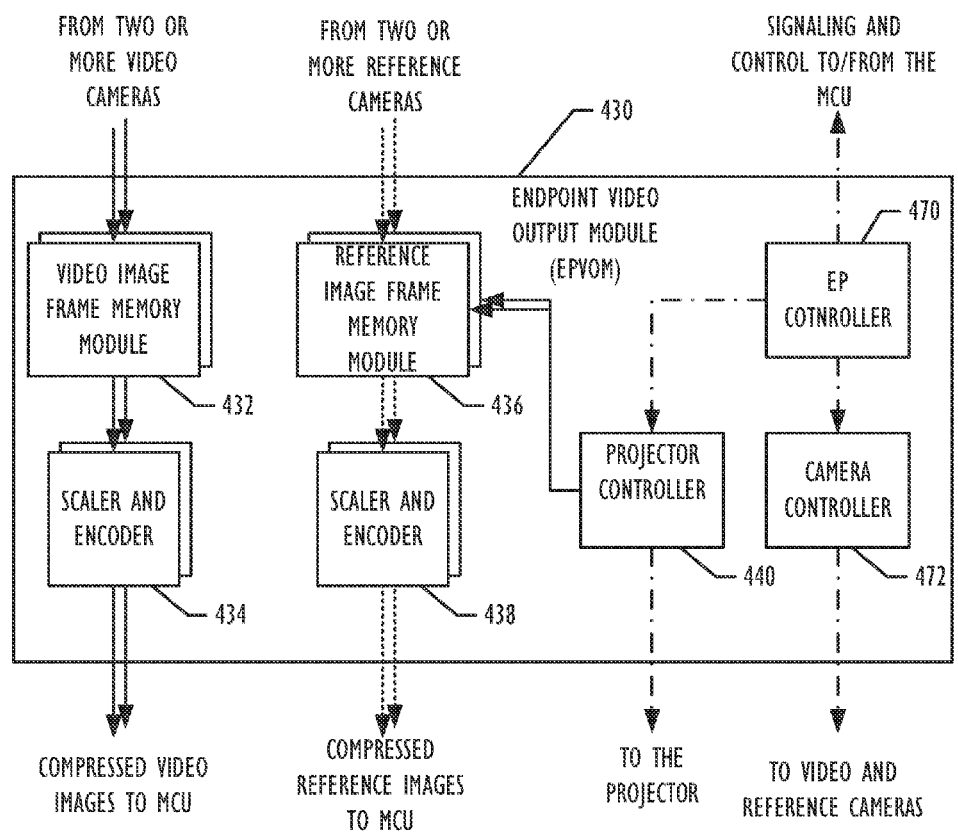

FIG. 4B illustrates a block diagram of an embodiment of an endpoint video output module (EPVOM) 430. The EPVOM 430 can be located at an endpoint 130 that relies on the MCU 120 to determine the location coordinates of the reference points. The EPVOM 430 receives the video images from the two or more video cameras 428L&R (FIG. 4A) and the reference images from the two or more associated reference cameras 424L&R. The EPVOM 430 can scale the images, compress the scaled images, and transmit the compressed images to the MCU 120 or the MRM. Processing the images to determine location coordinates of the reference points, as mentioned before, can be carried out at the MCU 120.

The EPVOM 430 can include two or more video image frame memory modules 432. Each video image frame memory module 432 can be associated with one video camera, which delivers the video images. After storing a complete frame with video image data, the stored video frame can be outputted to a scalar and encoder module 434, which can scale the video image to an appropriate size. The scaled video image can be compressed by the encoder and transmitted to the MCU 120 or the MRM. In some embodiments, where the image size of the video images needs no modifications, the scalar may not be necessary.

The EPVOM 430 can also include two or more reference image frame memory modules 436. Each module 436 can receive the reference images from reference cameras 424L and 424R. After storing a complete frame with the reference image data, the stored reference image frame can be outputted to a scalar and encoder module 438, which can scale the reference image frame to an appropriate size. Then the scaled image may be compressed by the encoder and be transmitted to the MCU 120 or the MRM. In some embodiments, where the image size of the reference images needs no modifications, the scalar may not be necessary.

In one embodiment, when the MCU 120 determines that location coordinates of the reference points are required, the MCU 120 can send a request to the endpoint 130 at the endpoint controller 470. The request can instruct the endpoint 130 to deliver reference images. In response the endpoint controller 470 can instruct the projector controller 440 to start projecting the invisible pattern. The invisible pattern can be projected only once for a certain duration. Alternatively, the invisible pattern can be projected multiple times, with a different portion of the pattern being projected each time. The duration of projection, whether only once or multiple times, can be adjusted to be at least longer than one frame capture duration of the reference cameras. After projecting a portion of the pattern, the projector controller 440 can instruct the projector to change the direction of the projected portion, or the projected group of invisible spots, to move to the next location and projecting the next slice. In addition, each time a slice or the entire invisible pattern is projected, a synchronization pulse can be sent from the projector controller 440 to the two or more reference image frame memory modules 436. Upon receiving the synchronization pulse the reference input frame memory modules 436 can capture the reference images received from the reference cameras 424L&R.

The EPVOM 430 can also include a camera controller 472 for controlling the setup of the video and reference cameras. During the adjustment process, the endpoint controller 470 can adjust the cameras to various zoom, tilt, etc. settings via the camera controller 472 so that video and reference images for various setups can be sent to the MCU 120 for determination of location coordinates of reference points for each of the various camera setups.

Figure 4C:
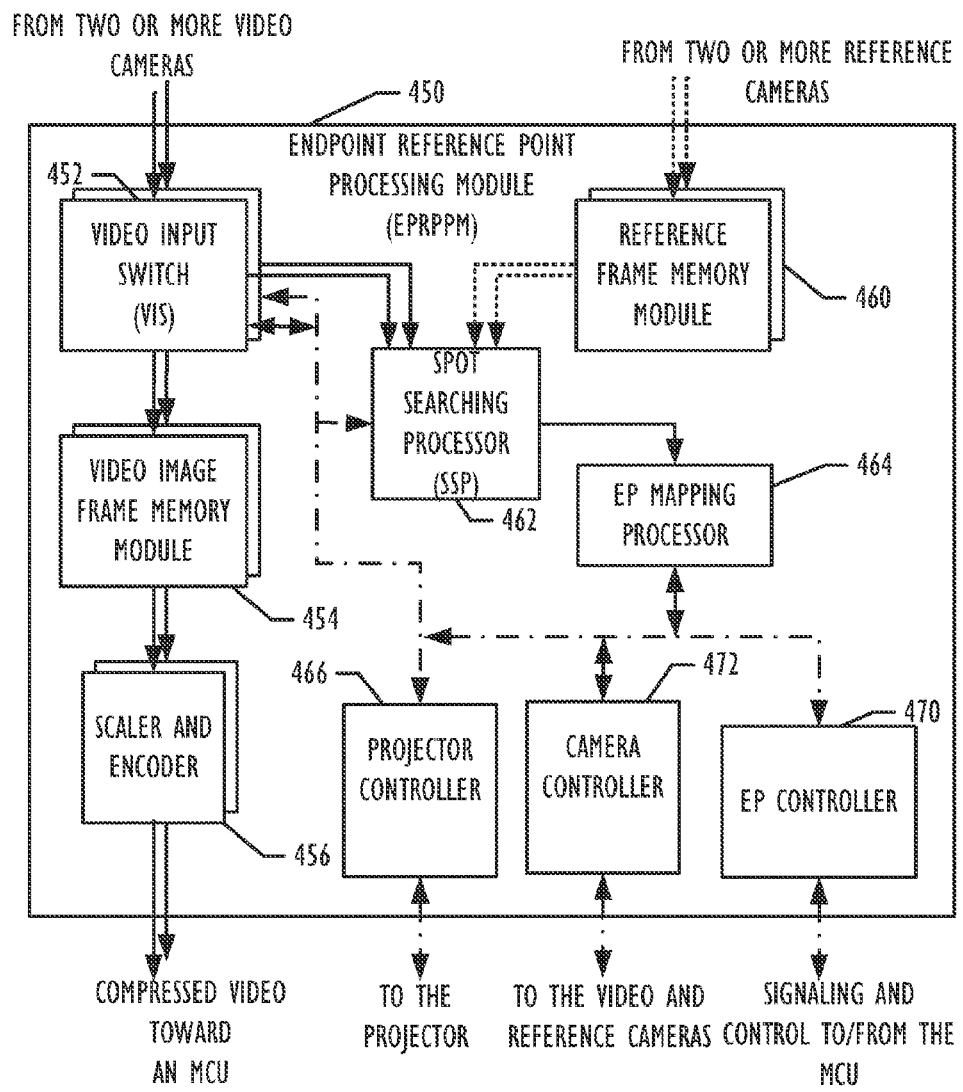

FIG. 4C illustrates a block diagram of another embodiment of an endpoint-reference-points-processing module (EPRPPM) 450. The EPRPPM 450 can be located at an endpoint 130 that is configured to determine the location coordinates of the reference points. The EPRPPM 450 can receive the video images from the two or more video cameras 428L&R (FIG. 4A) and can receive the reference images from the two or more associated reference cameras 424L&R. The EPRPPM 450 can scale the video images, compress them, and transmit the compressed video images to an MCU or an MRM 120. In addition EPRPPM 450 can process the video images as well as the reference images to determine location coordinates of the reference points. Once determined, the location coordinates of the reference points and/or the mapping tables can be sent to the MCU 120 (FIG. 1). The EPRPPM 450 can include three sections, a video images section, a reference image section, and a control and processing section.

The video images section can include two or more channels. Each channel can be associated with one of the two video cameras 428L and 428R. Each video channel can include a video input switch (VIS) 452, a video input frame memory module 454, and a scalar and encoder 456. The VIS 452 and the video frame memory module 454 may be organized in a different order than the one shown in FIG. 4C. For example, the video frame memory module 454 may be placed before the VIS 452.

Video images from the video camera 428L or 428R can be received by the VIS 452. During a conference session, when no adjustment process or LUT update is being carried out, the received video images can be transferred via VIS 452 to the video image frame memory module 454. After storing a complete frame of video data, the stored video image frame can be outputted to a scalar and encoder 456, which can scale the video image to a requested size. The scaled image can be compressed by the encoder and the compressed video image can be transmitted to the MCU 120 (FIG. 1) or the MRM.

During an adjustment process the VIS 452 can route the video images to a spot searching processor (SSP) 462. The routed video images can include images of the projected visible pattern captured by the video camera 428L or 428R. In some embodiments the video camera and an associated reference camera are mechanically and optically adjusted such that the relation between the location coordinates within the images captured by the cameras is known a priori, and may remain stable over time. In such cases, the VIS 452 may not need to route the video images to the SSP 462.

The reference image section of EPRPPM 450 can include two or more reference frame memory modules 460. Each module 460 can receive the reference images from its associated reference camera 424L or 424R. After storing a complete frame of the reference image, the stored reference image frame can be outputted to the SSP 462. SSP 462 can process the reference image frame to identify one or more spots that were projected by projector 426 (FIG. 4A). Searching for the spots and identifying each spot can be based on the shape of the projected invisible pattern. For example if each spot has a different shape then searching and identifying the spots can be based on a bank of match filters, where each filter can match the shape of a spot. In other embodiments in which the spots have similar shapes but differ from each other in location and time, then identifying the spots, by SSP 462, can be based on searching at a particular area in the reference image frame or searching a reference frame at a particular time. After identifying the location coordinates of each spot, the information is transferred toward an endpoint mapping processor 464. The endpoint mapping processor 464 can be part of the control and processing section of the EPRPPM 450.

The control and processing section of EPRPPM 450 can include the endpoint mapping processor 464, a projector controller 466, and an endpoint controller 470. The endpoint controller 470 can be configured to control the operation of the endpoint as well as the operation of the EPRPPM 450. On occasions, after installation, or after changing the location of the endpoint, or making changes in the room or any other changes that can affect the image received from any of the cameras associated with the endpoint, the endpoint controller 470 can begin the adjustment process. As previously described, the adjustment process is used for determining a transformation function for transforming the location coordinates in the reference image to corresponding location coordinates in the video image.

Upon initiating the adjustment process, the endpoint controller 470 can instruct the projector controller 466 to project a visible pattern similar to the invisible pattern. The endpoint controller 470 can also instruct the VIS 452 to deliver the received video image of the visible projected pattern of each video camera 428L&R to the SSP 462. The SSP 462 can process the visible image looking to the projected visible spots and define their location coordinates in the video image. Then, the endpoint controller 470 can instruct the projector controller 466 to project an invisible pattern. The received reference images of the invisible projected pattern from each associated and reference camera 424L&R via the reference frame memory 460 can be transferred to SSP 462. The SSP 462 can process the reference image searching for the projected invisible spots and define the location coordinates of each identified spot in the reference image. The information on the identified spots and their location coordinates in each of the video and reference images can be transferred to endpoint mapping processor 464. The EPRPPM 450 can also include a camera controller 472 for controlling the setup of the video and reference cameras. During the adjustment process, the endpoint controller 470 or the endpoint mapping processor 464 can adjust the cameras to various zoom, tilt, etc. settings via the camera controller 472 so that location coordinates can be determined for various camera setups.

The endpoint mapping processor 464 can process the received location coordinates of each identified spot in the video image and in the reference image. The results can be organized in mapping tables, which were described above, with one mapping table for each setup of the video camera (zoom, tilt, etc.). The process can be repeated for several setups of the cameras.

If location coordinates of reference points are required during an ongoing conference session, the endpoint controller 470 can instruct the projector controller 466 to project an invisible pattern. The image of the invisible pattern is captured by the two or more associated reference cameras 424L&R (FIG. 4A) and the resulting reference images are transferred via the appropriate reference frame memory 460 to the SSP 462. The SSP 462 can search the reference image for projected spots, and determine their location coordinates. The identified spots and their location coordinates can be transferred to the endpoint mapping processor 464. The endpoint mapping processor 464 can arrange the received identified spots and their location coordinates in mapping tables.

In an embodiment in which two sets of cameras are used, a mapping table can include a plurality of rows and two columns. Each row can be associated to an invisible spot that was identified in each of the reference images received from the two reference cameras 424L&R. The two columns can be associated with the two video images received from the two video cameras 428L&R. For each spot identified in both the reference images, the endpoint mapping processor 464 can convert the location coordinates of the spot in the reference image to the corresponding location coordinates in the visible image of the associated video camera. Converting the location coordinates can be based on the transformation function of the set. The calculated location coordinates of the spot in the visible image can be stored in the cell that is in the junction of the row allocated to the identified spot and the column allocated to the relevant video camera. The process can be repeated per each spot and each video camera. At the end, the mapping table can be transferred to endpoint controller 470, which may use the mapping table or may transmit it toward the MCU 120. More information on the operation of EPRPPM 450 is disclosed below in conjunction with FIGS. 5A-8.

Figure 5A:
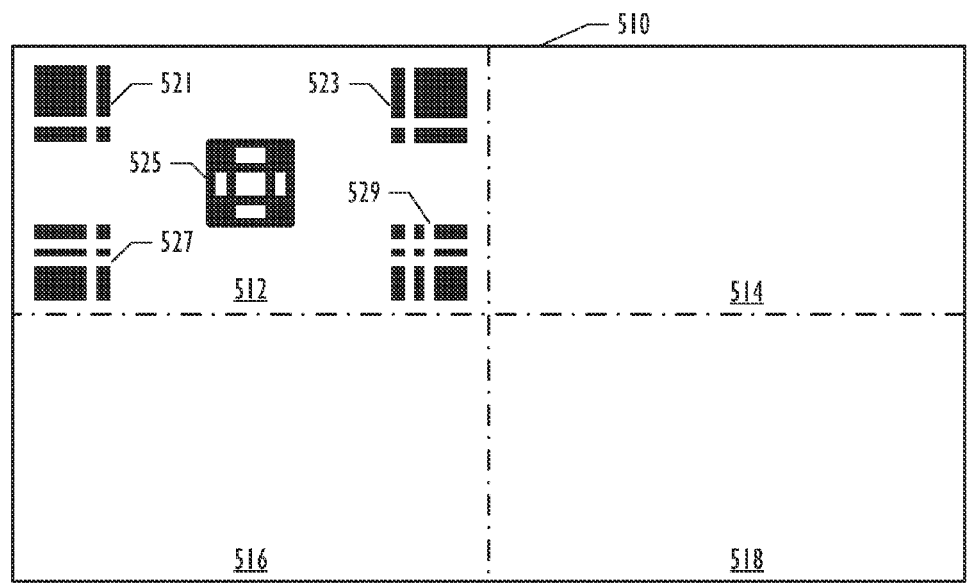
FIGS. 5A and 5B depict alternative projection patterns in accordance with an embodiment of the present disclosure.
Figure 5B:
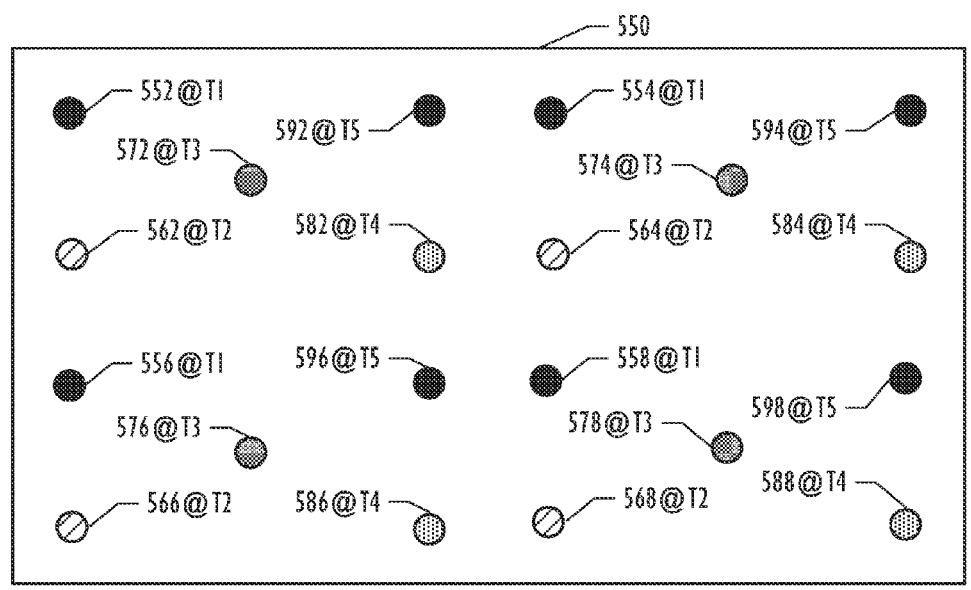

FIGS. 5A and 5B illustrate alternative projected patterns or images. FIG. 5A illustrates an example in which the projected area 510 is divided into four zones: the upper left side 512 of the projected area, the upper right side 514 of the projected area, the bottom left side 516 of the projected area, and the bottom right side 518 of the projected area. In such embodiment the projected pattern can be projected in four steps. The duration of each step can take one or more image frames of the camera. For example, the duration can be in the range of few tens of milliseconds to few hundreds of milliseconds. At each step the same image can be projected in the relevant zone (512, 514, 516, and 518) one zone after the other. The projected image can comprise a plurality of spots 521 to 529, where the spots can have different shapes.

The spots 521 to 529 can be detected using a matched filter that uses the shape of the spots as a mask to carry out correlation analysis between the image frame and the mask. However, the spots are not identified in a single image frame, but are identified over multiple image frames based on the timing of projection of the relevant zone.

FIG. 5B illustrates another example of a projected reference image 550. In this example the projected reference image 550 is projected in five steps (T1, T2, T3, T4, and T5). The duration of each step can take one or more frames of the reference camera. For example, the duration can be in the range of few tens of milliseconds to few hundreds of milliseconds. At each step the projected pattern can comprise a plurality of similar spots (similar shape and intensity). At T1 the projected image comprises four similar spots 552, 554, 556, and 558. In this step the distance between each projected spot is quite large, more than half of the projected area 550. In order to project the second image, at T2, the projector 426 can be instructed to tilt the projected image down in an angle which is close to half of the projected angle of the height of the pattern 550. At T2 the projected pattern can include another four spots but at different location 562, 564, 566, and 568. The four spots projected at time T2 can be similar to each other, but can be different from the spots projected at T1. Also in this step the distance between each projected spot is quite large, more than half of the area of the projected reference image 550. This projection process can be repeated, albeit with change in projection angle, and the spot until step T5. For example, at time T3, spots can be projected at locations 572, 574, 576, and 578. At time T4, spots can be projected at locations 582, 584, 586, and 588. Finally, at time T5, spots can be projected at locations 592, 594, 596, and 598. Thus, the combination of the patterns projected from time T1 to T5 will cover the area 550 with 20 spots in five steps, for example. As an alternative, all the spots projected at times T1-T5 can be similar.

For the above described example based on the timing (T1-T5) of the projection pattern, the SSP 462 (FIG. 4C) or RIP 324 (FIG. 3) can search the received reference image for spots in certain areas depending on the projected step (T1 to T5).

Figure 6:
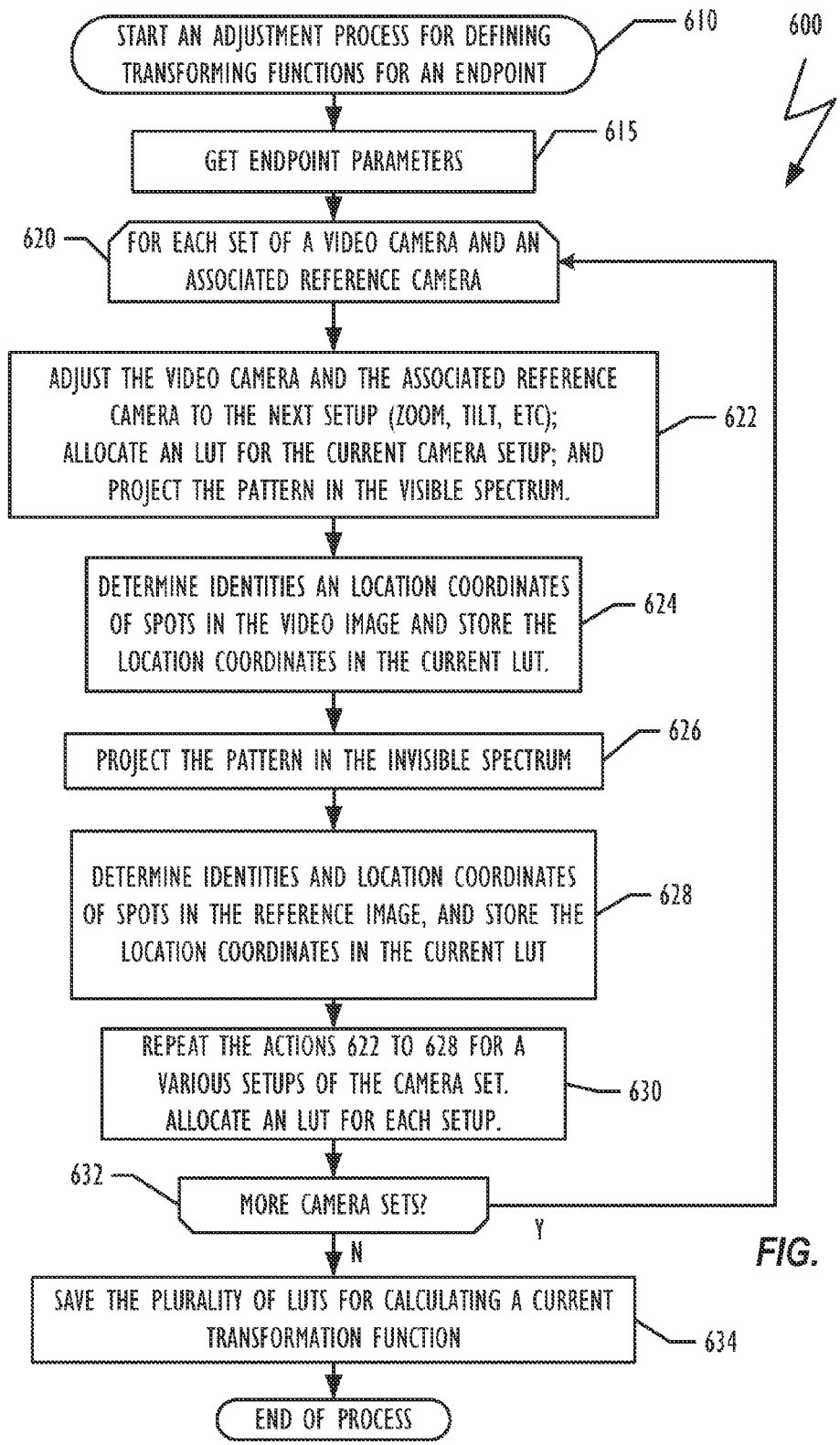
FIG. 6 illustrates a flowchart of an adjustment process for determining transformation functions in accordance with an embodiment of the present disclosure.

FIG. 6 illustrates a flowchart for an adjustment process 600, which is used to determine the transformation function. The method 600 can be executed by the EPMP 330 (FIG. 3) of the MCU 120, the endpoint mapping processor 464 (FIG. 4C), or the endpoint controller 470 (FIG. 4C) based on whether the MCU 120 and the endpoints 130 have been configured for centralized or decentralized operation.

Before describing the method 600 it should be noted that in embodiments where the video camera and its associated reference camera are mechanically and optically configured such that the transformation function for transforming location coordinates from reference images to video images is known a priori and remains relatively stable over time, there may be no need to carry out the adjustment process for the camera set. In such cases, it may be unnecessary to perform the method 600 of FIG. 6.

Process 600 may be initiated 610 after installation of an endpoint, or after changing the location of the endpoint, or making changes in the room or any other changes that can affect the image received from any of the cameras associated with the endpoint. After initiation 610 a processor that executes the process 600 can obtain 615 the parameters of one or more endpoints participating in the videoconferencing session. Parameters such as, but not limited to, the number of sets of video camera and its associated reference camera, the resolution of the images received from each type of camera, number of possible zooms, tilt options, etc. can be obtained. Based on the collected parameters a loop can be started from action 620 to action 632. Each cycle within the loop can be performed for one set of a video camera and its associated reference camera.

At the beginning 622 of a the loop for a first set of cameras, the video camera and the associated reference camera of that set can be configured to a first position, which can include one combination of the zoom level and the degree of tilt, for example. In addition, a LUT can be allocated to store the locations of the identified spots in both the video and reference images, in the current setup. The projector 426 (FIG. 4A) can be instructed to project a pattern in the visible spectrum. The VIS 452 (FIG. 4C) can be instructed to route the received video image from each one of the video cameras 428L&R to the SSP 462 (FIG. 4C) for processing.

SSP 462 can process 624 each received video image looking for projected spots, identify each spot, and determine its location coordinates (e.g., in pixels from the top left corner of the image). Identifying the spots can be based on the type of the projected pattern. If each spot has different shape, then identifying each spot can be based on a match filter that is adapted to the shape of the spot. If the spots in the pattern are modulated by time and location, identifying each spot can be based on the time and place that the spot was found. Other embodiments may use other type of image processing for identifying each spot. At the end of this action, the location coordinates of each spot ID is stored in the LUT. The cell in the LUT in which the coordinate of each found spots is in the junction of the row that is assigned to the ID of the spot and the column that was assigned to the video camera of the current camera set.

After storing the information regarding the spots in the visible image, the projector 426 (FIG. 4A) can be instructed to project 626 the pattern in the invisible spectrum. The reference frame memory module 460 (FIG. 4C) can be instructed to route the received reference image frame from each one of the associated reference cameras 424L&R to the SSP 462 (FIG. 4C) for processing.

The SSP 462 can process 628 each received reference image looking for projected spots, identify each found spot, and determine its location coordinates (e.g., in pixels from the top left corner of the reference image). As previously described, identifying the spots can be based on the shape, location, and time of projection of the spot. At the end of this action the location coordinates of each spot ID can be stored in the LUT in the column assigned to the reference camera of the current camera set.

Process 600 can repeat 630 the actions 622 to 628 for each one of the plurality of setups (zoom, tilt, etc.). After collecting the location coordinates of the captured spots of each one of the cameras of the set of cameras, method 600 can determine 632 whether additional camera sets exist. If yes, method 600 returns to step 620 and starts additional loop of adjustment for the next camera set. If there is no additional camera set, then the plurality of LUTs are stored 634 in memory to be used for calculating the transformation function. At this point the adjustment process can be terminated.

As discussed previously, in some embodiments the processing of the video images and the reference images to determine location coordinates of the reference points can be carried out at the MCU 120 instead of the endpoint 130. One such example can include the endpoint shown in FIG. 4B and the MCU shown in FIG. 3. A similar process to the alignment process 600 shown in FIG. 6, can then be executed at the MCU 120, however, the alignment process 600 may be repeated for one or more endpoints participating in the videoconferencing session.

Figure 7:
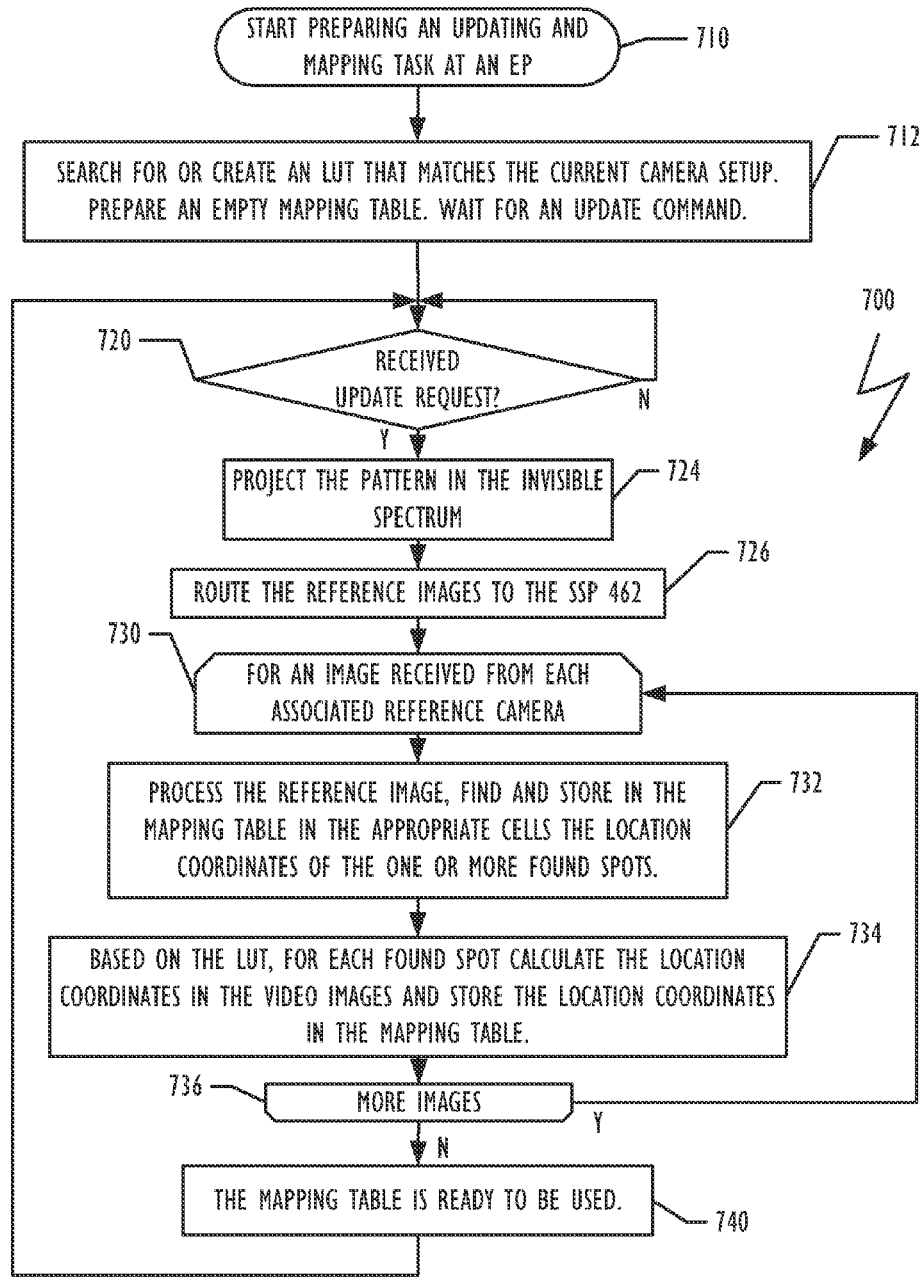
FIG. 7 illustrates a flowchart of a process for preparing and updating of mapping tables of the video cameras of an endpoint in accordance with an embodiment of the present disclosure.

FIG. 7 illustrates a flowchart for executing a mapping method 700 when location coordinates of reference points are needed. Method 700 can be implemented by the EPMP 330 (FIG. 3), the endpoint mapping processor 464 (FIG. 4C), or the endpoint controller 470 (FIG. 4C) of the endpoint 130.

Process 700 may be initiated 710 following a change in the setup of one of the camera sets. After initiation 710, a processor that executes the process 700 can search for 712 one or more LUTs that match the current camera setup. If a single LUT with a camera setup same as the current camera setup is found, then the single LUT can be used. Otherwise, two or more LUTs can be selected that were prepared for setups closest to the current camera setup. Then a matched LUT can be created, in which the location coordinates of each spot in the video image and the reference image can be calculated by interpolating location coordinates stored in the selected LUTs for that spot.

In addition, at act 712, an empty mapping table can be created. The empty mapping table can include a plurality of rows and columns. Each row can be associated with a projected spot ID and each column can be associated with the location coordinates of the spot in one of the images. In one embodiment the columns can be organized in pairs. Each pair can be assigned to a set of a video camera and an associated reference camera. The first column of a pair can store the location coordinates of each identified spot in the reference image, while the second column of the pair can store the calculated location coordinates of the identified spot in the video image. At this point, method 700 may wait 720 to receive an update request to update the mapping table. An update request can be received after changing the setup of a set of cameras, or each time coordinates of one or more reference points are needed (by the MCU 120, for example).

Upon receiving a request 720 to update the mapping tables, the projector 426 (FIG. 4A) can be instructed 724 to project 734 the pattern in the invisible spectrum. Reference image frame memory module 460 (FIG. 4C) can be instructed to route 726 the received reference image frame from each one of the associated reference cameras 424L&R to the SSP 462 (FIG. 4C) to be processed in a loop from action 730 to 736. Each cycle in the loop can be associated to an image received from one of the associated reference cameras.

For each image, the SSP 462 can process 732 the reference image looking for projected spots at that image. Each found invisible spot is identified and its location in pixels from the top left corner of the image can be stored in the appropriate cell of the mapping table, i.e., the cell that is in the junction of the spot ID and the column that is assigned to the relevant associated reference camera.

For each cell of the mapping table with an identified spot in the reference image, method 700 can calculate 734 the corresponding location coordinates in a video image received from the video camera, of the same set, and store the calculated location coordinates in the adjacent cell in the mapping table. In one embodiment of process 700, calculating the location coordinates of each identified spot in the video image can be carried out keeping the relative sizes and resolutions of the video and reference images. For example, assuming that the resolution of the video image is $Hv \times Wv$ and the resolution of the reference image is $Hr \times Wr$. Assuming now that the coordinates of a certain spot, spot n, in the LUT are $Hvn \times Wvn$ and the coordinates of the same spot, spot n, in the reference image are $Hrn \times Wrn$, then if the coordinates of the found spot in the current process are $H'rn \times W'rn$ the process 700 may calculate the coordinates of the same spot, spot n, in the visible image, $H'vn \times W'vn$ as follows: $H'vn$ can be equal to $H'rn$ divided by $Hrn$ multiplied by $Hvn$, for example. The other coordinate $W'vn$ can be calculate in a similar way using the values of $W'rn$, $Wrn$ and $Wvn$.

After storing 734 the location coordinates of each identified spot in the reference and the calculated location coordinates in the video image, a decision is made 736 whether there is an additional reference image received from another reference camera from another set of cameras. If yes, method 700 returns to action 730. If there are no more reference images, then 740 the current mapping table is ready to be used and method 700 may return to action 720 waiting for the next update request.

As discussed above, in some embodiments the tasks of processing the video images and the reference images for determining the location coordinates of the reference points can be performed primarily by the MCU 120. In such an embodiment, represented by the endpoint 130 shown in FIG. 4B and the MCU 120 shown in FIG. 3, the method 700 can be executed at the MCU 120 and may be repeated for each endpoint participating in the videoconference session. Furthermore, each loop may include transmitting instructions to the endpoint 130, the instructions requesting an update of the mapping table, etc.

Figure 8:
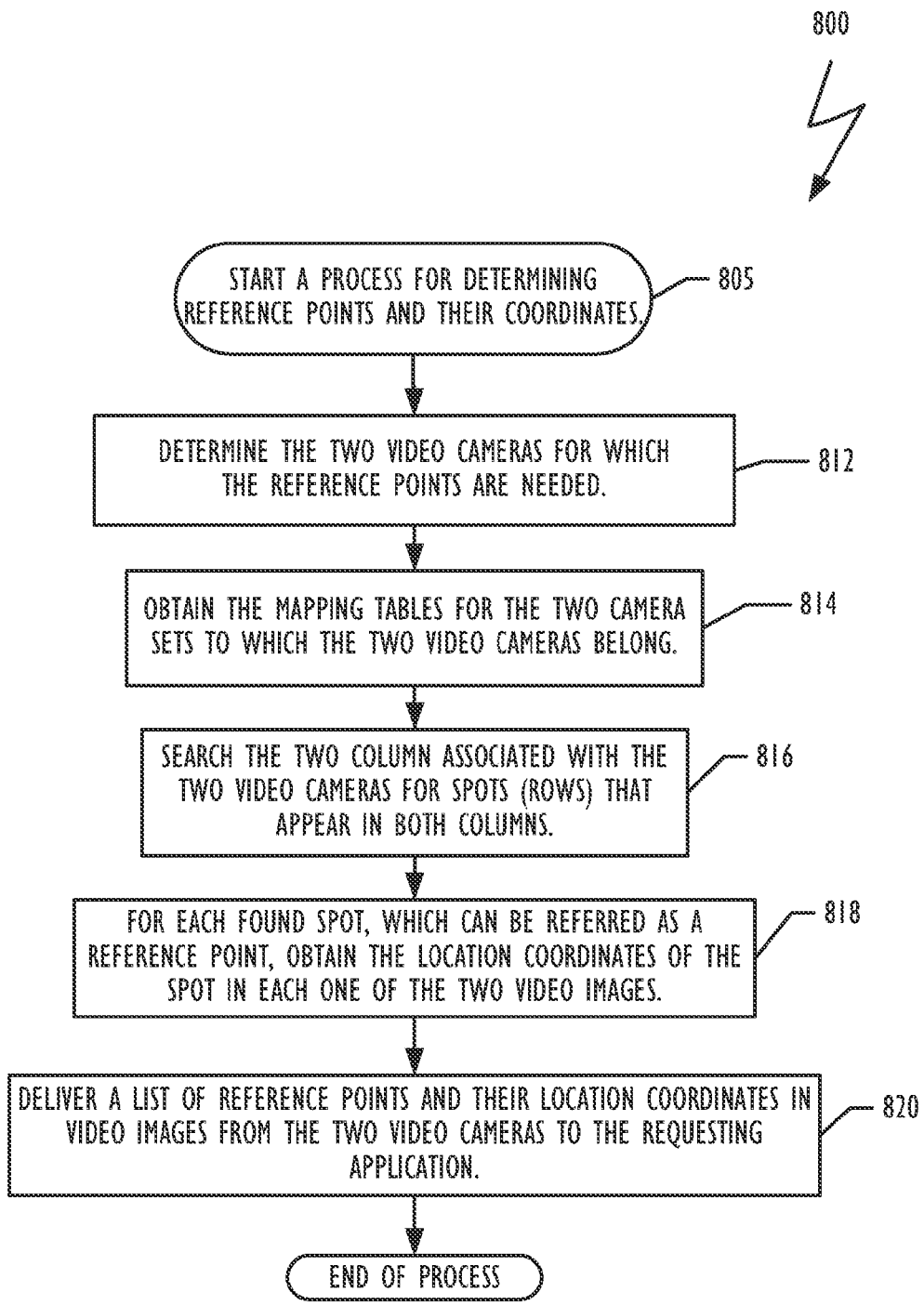
FIG. 8 illustrates a flowchart of a process for determining reference points in two video images received from two video cameras in accordance with an embodiment of the present disclosure.

FIG. 8 illustrates a flowchart of a method 800 for defining one or more reference points, which appear in video images received from two different video cameras shooting in the same room (e.g., cameras 428L&R of FIG. 4A). The method 800 can be executed by the EPMP 330 of the MCU 120 (FIG. 1). Alternatively the method 800 may be executed by the endpoint mapping processor 464 or the endpoint controller 470 of an endpoint 130 (FIG. 1) having EPRPPM 450 (e.g., FIG. 4C).

The method 800 may be initiated 805 by an application that requires coordinates of one or more reference points. After initiation 805, a processor that executes the process determines 812 the two video cameras for which the reference points are needed. In endpoints that have only two sets of cameras (428L; 424L) & (428R; 424R), this step may not be required.

The current mapping tables for each of the two selected camera sets can be obtained 814, and the two columns that are associated with the two selected video cameras 428L&R in the mapping table can be searched 816 looking for spots (rows) that appear in both the columns. Each spot that has coordinates in both columns can be used as reference points. Then a list of reference points can be prepared 820. Each row in the list can be allocated to a spot that has coordinates in both the columns. The first cell in each row can include the spot ID, the following cell can include the location coordinates of the spot in the video image received from the left camera 428L and the last cell can include the location coordinates of the spot in the video image received from the right camera 428R. In 818 for each found spot that can be considered a reference point, the location coordinates of the spot in each of the two video images is obtained for the list. The list with the coordinates of the reference points can be delivered to the application that initiated the process and method 800.

It is to be understood that the above description is intended to be illustrative, and not restrictive. The above-described apparatus, systems, and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser. The scope of the invention is limited only by the following claims and equivalents thereof.

What is claimed is:

1. A method performed by a control unit (CU) for aligning two or more video image frames received from two or more video cameras at an endpoint, the endpoint communicably connected to the CU via a communication network, comprising:

receiving two or more reference image frames from the endpoint; and determining two or more reference points, each reference point located in at least two of the two or more video image frames, the two or more reference points derived from location coordinates of a same spot of a projected reference image captured in the two or more reference image frames, wherein the projected reference image includes a plurality of patterns, and wherein the same spot corresponds to one of the plurality of patterns.

2. The method of claim 1, further comprising sending a communication to the endpoint, the communication including instructions to the endpoint to project a reference image.

3. The method of claim 1, wherein the CU is a multipoint control unit (MCU).

4. The method of claim 2, wherein the communication to the endpoint further includes instructions to the endpoint to project the reference image in an invisible spectrum.

5. The method of claim 2, wherein the communication further includes instructions to the endpoint to capture the two or more reference image frames using two or more reference cameras, each of the two or more reference cameras paired with one of the two or more video cameras.

6. The method of claim 5, wherein the determining the two or more reference points comprises transforming the location coordinates of the same spot of the projected reference image from within the two or more reference image frames into location coordinates within the two or more video image frames.

7. The method of claim 6, wherein the transforming is based on lookup tables, each lookup table comprising location coordinates of at least one spot as the at least one spot appears in one of the reference image frames and paired video image frames.

8. The method of claim 7, wherein the lookup tables are received from the endpoint.

9. The method of claim 7, wherein the lookup tables are generated by the CU.

10. The method of claim 7, further comprising:
sending another communication to the endpoint, the another communication includes instructions to the endpoint to alter a camera configuration of one or more of the two or more video cameras; and
repeating the steps of sending, receiving, and determining two or more reference points.

11. The method of claim 1, wherein the location coordinates of the same spot in the two or more reference image frames are determined by correlating a mask for each of the plurality of patterns with each of the two or more reference image frames.

12. The method of claim 1, further comprising manipulating the two or more video image frames as a function of the two or more reference points.

13. The method of claim 1, wherein the communication further includes instructions to the endpoint to capture the two or more reference image frames using the two or more video cameras.

14. The method of claim 13, wherein the determining the two or more reference points comprises defining the location coordinates of the same spot of the projected reference image captured in the two or more reference image frames as the two or more reference points.

15. A non-transitory computer readable medium containing a program for performing a method comprising:

projecting a reference image in front of two or more video cameras and two or more reference cameras of an endpoint, each of the two or more reference cameras paired with one of the two or more video cameras;

capturing two or more video image frames by the two or more video cameras;

capturing two or more reference image frames by the two or more reference cameras; and determining two or more reference points, each reference point located in one of two or more video image frames and derived by transforming location coordinates of a same portion of the projected reference image captured in the two or more reference image frames into location coordinates within the two or more video image frames, wherein the projected reference image includes a plurality of patterns, and wherein the same portion of the projected reference image captured in the two or more reference image frames corresponds to one of the plurality of patterns.

16. A non-transitory computer readable medium containing a program for performing a method performed by a multipoint control unit (MCU) for aligning two or more video image frames received from two or more video cameras at an endpoint, the endpoint communicably connected to the MCU via a communication network, comprising:

sending a communication to the endpoint, the communication including instructions to the endpoint to project a reference image;

receiving two or more reference image frames from the endpoint; and determining two or more reference points, each reference point located in one of the two or more video image frames, the two or more reference points derived from transforming location coordinates of a same portion of the projected reference image captured in the two or more reference image frames into location coordinates within the two or more video image frames, wherein the projected reference image includes a plurality of patterns, and wherein the same portion of the projected reference image captured in the two or more reference image frames corresponds to one of the plurality of patterns.

17. An endpoint comprising:
two or more video cameras;
a projector configured to project a reference image in front of the two or more video cameras; and
a processing module communicably coupled to the two or more video cameras and the projector, the processing module programmed to:
instruct the projector to project the reference image;
receive two or more video image frames, one each from each of the two or more video cameras;
receive two or more reference image frames; and
determine two or more reference points,
wherein each reference point is located in at least two of the two or more video image frames, and
wherein the two or more reference points are derived from location coordinates of a same spot of the projected reference image captured in the two or more reference image frames; and
transform location coordinates of the same spot of the projected reference image into location coordinates with the two or more video image frames,
wherein the projected reference image includes a plurality of patterns, and
wherein the same spot corresponds to one of the plurality of patterns.

18. The endpoint of claim 17, wherein the projector is further configured to project the reference image in an invisible spectrum.

19. The endpoint of claim 17,
wherein the processing module is further programmed to determine the location coordinates of the same spot in the two or more reference image frames by correlating a mask for each spot with each of the two or more reference image frames.

20. The endpoint of claim 17, wherein the processing module is further programmed to communicate the two or more reference points to a control unit or another endpoint.

21. The endpoint of claim 20, further comprising:
two or more reference cameras,
wherein the two or more reference image frames are captured by the two or more reference cameras.

22. A method comprising:
projecting a reference image in a room having an endpoint;
capturing a plurality of reference image frames;
processing the captured plurality of reference image frames and detecting a reference point that appears in at least two of the captured plurality of reference image frames; and
transforming location coordinates of the reference point in each of the captured plurality of reference image frames into coordinates of video image frames received from video cameras of the endpoint,
wherein the reference image comprises a plurality of different reference patterns.

23. The method of claim 22, wherein capturing a plurality of reference image frames is performed by a plurality of reference cameras of the endpoint.

24. The method of claim 22, wherein projecting the reference image is performed in an invisible spectrum.

25. The method of claim 22, wherein the plurality of different reference patterns differ in time and location in the plurality of reference image frames.

* * * * *